US006768658B2

(12) United States Patent
Perry (10) Patent No.: US 6,768,658 B2
(45) Date of Patent: Jul. 27, 2004

(54) DC-DC POWER SUPPLY WITH AT LEAST TWO PARALLELED CONVERTERS AND CURRENT SHARE METHOD FOR SAME

(75) Inventor: Marty Perry, Tucson, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 10/234,221

(22) Filed: Sep. 4, 2002

(65) Prior Publication Data

US 2004/0041548 A1 Mar. 4, 2004

(51) Int. Cl.[7] .................................................. H02M 3/00
(52) U.S. Cl. ........................................... 363/65; 307/82
(58) Field of Search .............................. 363/65, 67, 69, 363/71, 131, 132, 124; 307/82

(56) References Cited

U.S. PATENT DOCUMENTS

| | | | |
|---|---|---|---|
| 4,425,613 A | * | 1/1984 | Shelly ........................... 363/26 |
| 4,719,559 A | * | 1/1988 | Sokal et al. ................... 363/98 |
| 5,521,809 A | * | 5/1996 | Ashley et al. ................. 363/71 |
| 5,604,669 A | | 2/1997 | Strong, III |
| 5,663,874 A | | 9/1997 | Mader et al. |
| 5,861,734 A | | 1/1999 | Fasullo et al. |
| 5,903,447 A | | 5/1999 | Takahashi et al. |
| 5,912,549 A | | 6/1999 | Farrington et al. |
| 5,956,239 A | | 9/1999 | Giacomini |
| 5,982,160 A | | 11/1999 | Walters et al. |
| 6,009,000 A | * | 12/1999 | Siri ........................... 363/21.09 |
| 6,055,169 A | | 4/2000 | Bowman et al. |
| 6,147,886 A | | 11/2000 | Wittenbreder |
| 6,154,381 A | * | 11/2000 | Kajouke et al. ............... 363/65 |
| 6,181,120 B1 | | 1/2001 | Hawkes et al. |
| 6,229,293 B1 | | 5/2001 | Farrenkopf |
| 6,285,234 B1 | | 9/2001 | Wu |
| 6,343,026 B1 | | 1/2002 | Perry |
| 6,346,798 B1 | * | 2/2002 | Passoni et al. ............... 323/272 |

* cited by examiner

Primary Examiner—Adolf Berhane
(74) Attorney, Agent, or Firm—Kilpatrick & Lockhardt LLP (57) ABSTRACT

A DC-DC power supply with at least two paralleled converters and a current share method for the power supply are presented. According to one embodiment, the power supply includes first and second current mode controlled power converters connected in parallel for powering a load. Each of the paralleled power converters may include a voltage error amplifier, and the output terminals of the respective voltage error amplifiers are connected together. The power supply further includes a slow loop current share control circuit that is responsive to a sensed current in each of the power converters and, based on the sensed currents, forces the power converters to equally contribute to the load current.

57 Claims, 3 Drawing Sheets

DC-DC POWER SUPPLY WITH AT LEAST TWO PARALLELED CONVERTERS AND CURRENT SHARE METHOD FOR SAME

BACKGROUND OF THE INVENTION

1. Field of Invention

The present invention relates generally to DC-DC power conversion.

2. Description of the Background

DC-to-DC power converters are power-processing circuits that typically are used to convert an unregulated input DC voltage to a regulated DC output voltage. Switched-mode DC-to-DC power converters typically include an inverter, a transformer having a primary winding coupled to the inverter, and a rectifying circuit coupled to a secondary winding of the transformer. The inverter typically includes a switching device, such as a field effect transistor (FET), that converts the DC input voltage to an alternating voltage, which is magnetically coupled from the primary winding of the transformer to the secondary winding. A control circuit regulates conduction of the switching device. The rectifying circuit rectifies the alternating voltage on the secondary winding to generate a desired DC output voltage.

There are several known techniques for controlling the switching device(s) of a switched-mode converter. In conventional current mode DC-DC converters, the duty cycle of the switching device of the converter is modulated by a negative feedback voltage loop to maintain the desired output voltage. The negative feedback loop ordinarily includes a voltage error amplifier that compares a signal indicative of the output voltage to a reference voltage. In typical current mode control circuits, when the sum of the sensed transformer current and the compensating ramp from the voltage error amplifier exceed an error current signal, a latch is reset and the switching device is turned OFF.

To enhance power-processing density, or to meet increased current demands of the load, it is often desirous to connect several switch-mode converters in parallel. In a typical paralleled switch-mode converter configuration, each converter is designed to contribute an equal amount of current to the load in the presence of inevitable variations in reference voltages and component values.

Several techniques for enhancing current sharing between paralleled converters are known. One technique when using current mode control is to tie the outputs of the respective voltage error amplifiers together. This technique is sometimes referred to as the "comp pin" technique. Another distinct technique is to derive a share function that uses a sensor amplifier to generate a share bus that is proportional to the total load current. A slow speed servo loop can then adjust the voltage loop of each converter to force balance of the load current between the paralleled converters.

BRIEF SUMMARY OF THE INVENTION

In one general respect, the present invention is directed to a power supply. According to one embodiment, the power supply includes first and second current mode controlled power converters connected in parallel for powering a load. Each of the paralleled power converters may include a voltage error amplifier, and the output terminals of the respective voltage error amplifiers may be tied together. The power supply further includes a slow loop current share control circuit that is responsive to a sensed current in each of the power converters and, based on the sensed currents, forces the power converters to equally contribute to the load current.

According to various embodiments, the power converters may be buck converters, boost converter, buck-boost converter, or any other derived topology. The converters may also include a synchronous rectifier. In addition, the power supply may include more than two converters connected in parallel.

According to one embodiment, the slow loop current share control circuit may include a first current sense integrating circuit responsive to the sensed current in the first converter and a second current sense integrating circuit responsive to a sensed current in the second converter. The slow loop current share control circuit may also include two differential integrating circuits. The first differential integrating circuit may have a first input terminal connected to an output terminal of the first current sense integrating circuit, and the second differential integrating circuit may have a first input terminal connected to an output terminal of the second current sense integrating circuit. In addition, a second input terminal of the first and second differential integrating circuits may be connected together. The output terminals of the differential integrating circuit may be connected to respective current mode control circuits of the power converters. The slow loop current share control circuit may also include a pair of series-connected resistors connected between the output terminals of the first and second current sense integrating circuits. A node between the pair of series-connected resistors may be connected to the second input terminals of the first and second differential integrating circuits. The slow loop current share control circuit may therefore be configured to effectively null (i.e., minimize) errors (such as offset errors or peak-to-arrange errors) introduced by the high speed (or transient condition) current share control loop (i.e., the interconnection of the outputs of the voltage error amplifiers).

In another general respect, the present invention is directed to a current share method for a power supply having at least two paralleled converters for powering a load. According to one embodiment, the method includes generating a first voltage error signal based on an output voltage of a first of the paralleled converters and generating a second voltage error signal based on an output voltage of a second of the paralleled converters. The method further includes coupling the first and second voltage error signals to a common node, wherein an input terminal of a current mode control circuit of the first converter and an input terminal of a current mode control circuit of the second converter are both connected to the common node to provide a high-speed (or transient condition) current share control loop. The method further includes sensing currents in the first and second converters, and minimizing errors of the high-speed current share control loop during steady-state conditions of the power supply based on the sensed currents in the first and second converters.

In another general respect, the present invention is directed to a power supply module. According to one embodiment, the power supply module includes a power converter, a voltage error amplifier connected to the power converter and responsive to an output voltage of the power converter, and a current sensing element connected to the power converter for sensing a current in the power converter. The module further includes a slow loop current share control sub-circuit connected to the current sensing element. According to various embodiments, the power converter may be a buck converter, a boost converter, a buck-boost converter, or any other derived topology. The converter may also include a synchronous rectifier. Two or more such modules may be connected in parallel to form a current mode control power supply.

BRIEF DESCRIPTION OF THE FIGURES

Embodiments of the present invention are described in conjunction with the following figures, wherein.

DETAILED DESCRIPTION OF THE INVENTION

Figure 1:
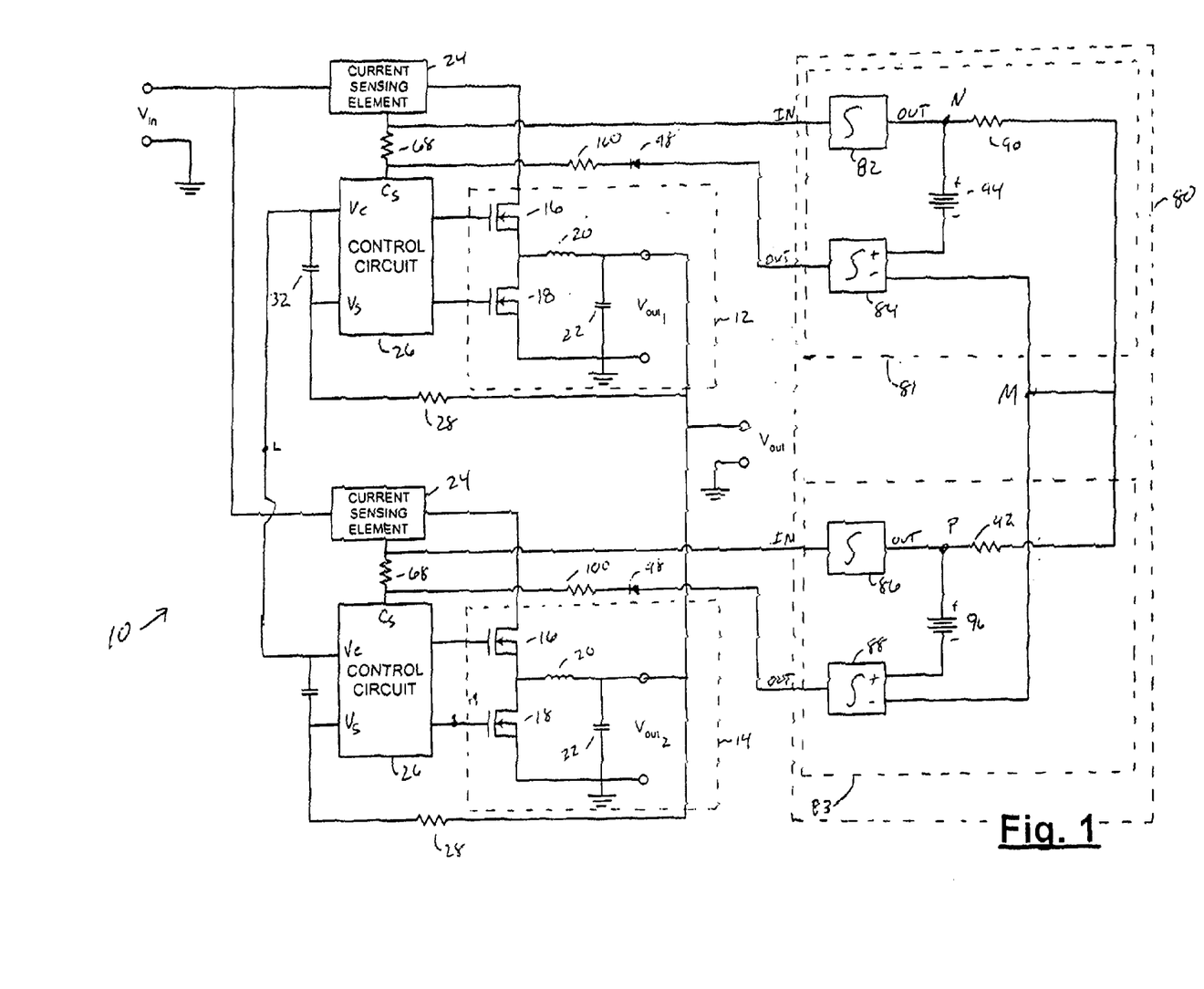
FIG. 1 is a schematic diagram of a power supply according to one embodiment.

FIG. 1 is a diagram of a power supply 10 according to one embodiment of the present invention. The illustrated embodiment includes two switch-mode power converters 12, 14 connected in parallel. Other embodiments of the power supply 10 may include an additional number of paralleled power converters, such as three or more paralleled converters. According to various embodiments, the paralleled converters may be frequency synchronous or asynchronous.

In FIG. 1, each of the power converters 12, 14 are buck converters including a switching device 16, a rectifying device 18, an inductor 20 and a capacitor 22. The switching devices 16 may include a MOSFET, as illustrated in FIG. 1, although according to other embodiments one or both of the switching devices 16 may be a bipolar switching device such as, for example, a BJT or an IGBT. In the illustrated embodiment, the rectifying device 18 is a synchronous rectifier embodied as a MOSFET. For convenience, a rectifying device 18 that is implemented as a synchronous rectifier is sometimes referred to herein as "SR 18," and the buck converter having a synchronous rectifier, as illustrated in FIG. 1, is sometimes referred to herein as a "synchronous buck converter." According to other embodiments, one or both of the rectifying devices 18 may be, for example, a diode.

As can be seen in FIG. 1, the input voltage ($V_{in}$) to the power supply 10, which may be, for example, the output of an AC-DC converter, the output of another DC-DC converter, the output of a battery or the output of an uninterruptable power supply, is coupled to both the switching devices 16 of the respective power converters 12, 14 via a current sensing element 24 (to be described in more detail herein). The outputs of the respective converters 12, 14 ($V_{out-1}$ and $V_{out-2}$) are coupled together to provide an output voltage ($V_{out-1}$) for the power supply 10 that may be used to power a load (not shown). The operation of buck converters are known and are, therefore, not described further herein. According to other embodiments, the power converters 12, 14 may employ other power conversion topologies besides the buck topology such as, for example, a boost topology, a buck-boost topology, or a topology derived therefrom. Additionally, these other topologies may include synchronous rectifiers according to embodiments of the present invention.

In the embodiment illustrated in FIG. 1, the switching device 16 and the SR 18 of the respective power converters 12, 14 are controlled by a control circuit 26, respectively. The control circuits 26 may receive a number of inputs and based on those inputs control the devices 16, 18 of the power converters 12, 14 according to, for example, a current mode control scheme. For example, the control circuits 26 may receive an input signal ($C_s$) indicative of the input current as sensed by the current sensing elements 24. In addition, the control circuits 26 may receive an input signal ($V_s$) indicative of the output voltage ($V_{out}$) of the respective converters 12, 14. This may be achieved, for example, by coupling the output of the respective converters 12, 14 to an input of the control circuit 26 via a resistor 28. As illustrated in FIG. 1, the control circuits 26 may also receive an error voltage ($V_e$) input provided by connecting a capacitor 32 across the $V_e$ and $V_s$ input terminals of the control circuits 26. Based on these inputs, the control circuits 26 may generate control signals to control the switching device 16 and the SR 18 of the respective power converters 12, 14. A first output signal (A) controls the switching device 16 and a second output signal (B) controls the SR 18.

Figure 2:
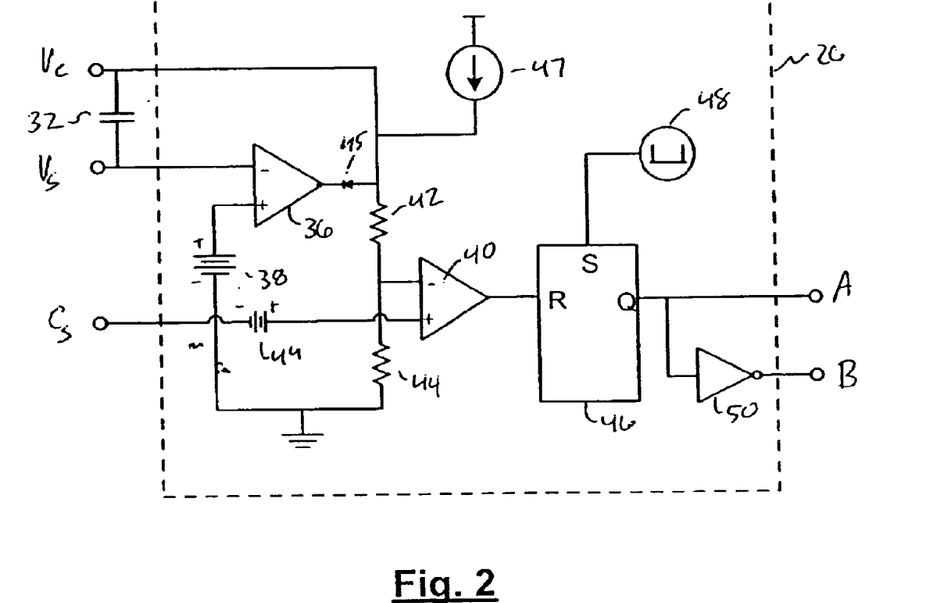
FIG. 2 is a schematic diagram of a control circuit of the power supply of FIG. 1 according to one embodiment.

FIG. 2 is a diagram of one of the control circuits 26 for implementing current mode control according to one embodiment of the present invention. The other control circuit 26 may be identically configured, and therefore is not additionally described herein. The control circuit 26 may generate pulse width modulated output signals A and B for controlling the switching device 16 and the SR 18 respectively. The Vs signal may be coupled to the inverting terminal of an amplifier 36, hereinafter sometimes referred to as a "voltage error amplifier." A power source 38, such as, for example, a battery or a voltage divider network, may be coupled to the noninverting terminal of the amplifier 36. According to one embodiment, the amplifier 36 may be implemented as an op-amp. As such, the power source 38 may server as the reference voltage for the voltage error amplifier 36.

The output terminal of the voltage error amplifier 36 may be coupled to the cathode terminal of a diode 45. The anode terminal of the diode 45 may be coupled to the $V_e$ signal input. In addition, a current source 47 may be coupled to the anode terminal of the diode 45. As described further herein, the diode 45 and current source 47 permit the $V_e$ terminals of the respective control circuits 26 to be tied together (the so-called "comp pin" configuration).

The anode terminal of the diode 45 may also be coupled to a first input terminal of a comparator 40 via a resistor-divider network comprising series-connected resistors 42, 44. The second input terminal of the comparator 40 may be responsive to the current sense signal ($C_s$) from the current sensing element 24 (see FIG. 1), via a power source 49, which may provide an offset voltage.

The output of the comparator 40 is coupled to an input terminal (R) of a flip-flop 46, which may be set by an oscillator 48 operating at a fixed frequency. The output (Q) of the flip-flop 46 provides the control signal A to the switching device 16, and will be a logic high, thus initiating turn-on of the switching device 16, the instant the flip-flop 46 is set, and will go low, initiating turn-off of the switching device 16, when the current sense signal ($C_s$) crosses the level of the $V_e$ signal. The output signal B may be generated by inverting signal A through an inverter 50. According to one embodiment, each of the control circuits 26 may be implemented using, for example, a current mode PWM controller IC, such as a TL 3842 current mode PWM controller IC available from Texas Instruments.

As illustrated in FIG. 1, the $V_e$ signal input terminals of the respective control circuits 26 may be coupled together at node L so that the $V_e$ signal is the same, to thereby provide a high-speed current share loop for the power supply 10. As such, the output terminals of the respective voltage error amplifiers 36 are connected together. More details regarding current share control are provided hereinafter.

Figure 3:
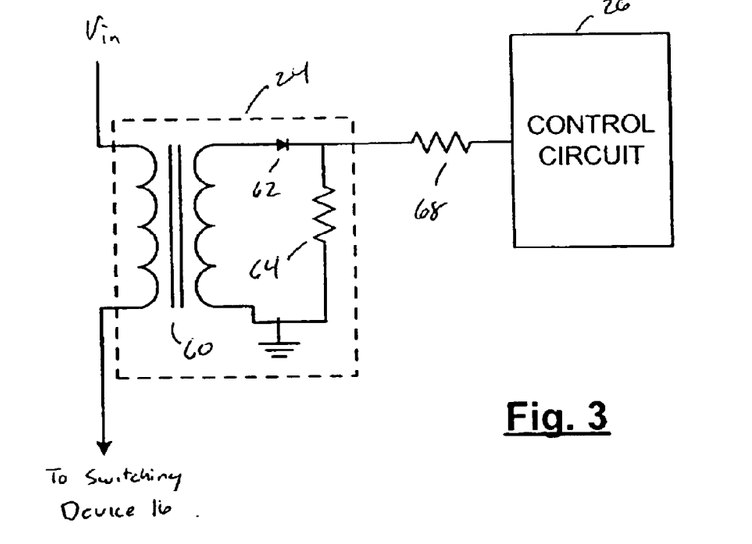
FIG. 3 is a schematic diagram of a current sensing element of the power supply of FIG. 1 according to one embodiment.

FIG. 3 is a diagram of one of the current sensing elements 24 according to one embodiment of the present invention. The other current sensing element 24 may be identically configured, and therefore will not be additionally described herein. As illustrated in FIG. 3, the current sensing element 24 may include a transformer 60, a diode 62 and a resistor 64. The primary winding of the transformer 60 may be coupled between the input voltage ($V_{in}$) and a terminal of the switching device 16 of the power converter. The secondary winding of the transformer 60 may be coupled to the control circuit 26 via the diode 62 and the resistor 64. The cathode terminal of the diode 62 may be coupled to the control circuit 26, via a resistor 68, to provide a sawtooth waveform, corresponding to the current sense signal $C_s$, coupled to the comparator 40 (see FIG. 2) of the control circuit 26. According to another embodiment, the current sensing element 24 may be implemented as a current sensing resistor. In addition, according to other embodiments, the current sensing element 24 may sense a current other than the current through the switching device 16 such as, for example, output current or inductor current (such as the current through inductor 20).

Returning to FIG. 1, the power supply 10 additionally includes a slow loop current share control circuit 80. The control circuit 80 may comprise slow loop current share control sub-circuits 81, 83 for the respective converters 12, 14, coupled together at node M. As illustrated in FIG. 1, the slow loop current share control circuit 80 includes a number of integrating circuits 82, 84, 86 and 88. Slow loop current share control sub-circuit 81 may include integrating circuits 82, 84, and sub-circuit 83 may include integrating circuits 86, 88. Each of the integrating circuits 82, 84, 86 and 88 may be implemented with, for example, op-amps, as will be apparent from the description to follow, although according to other embodiments different circuit configurations for performing integration functions may also be utilized.

The integrating circuit 82 may integrate the current sense signal $C_s$ from the current sensing element 24 for the first power converter 12. Similarly, the integrating circuit 86 may integrate the current sense signal $C_s$ from the current sensing element 24 for the second power converter 14. For this reason, the integrating circuits 82, 86 are sometimes referred to herein as "current sense integrating circuits." The output terminals of the current sense integrating circuits 82, 86 may be coupled together by a pair of resistors 90, 92 connected in series. According to one embodiment, the resistors 90, 92 have equal resistance values.

The output of the integrating circuit 82 may also be input to the integrating circuit 84. A voltage source 94, which may be implemented using a voltage divider network, may be coupled between the output of the integrating circuit 82 and the input of the integrating circuit 84. Similarly, the output of the integrating circuit 86 may be input to the integrating circuit 88 via voltage source 96. The voltage source 96, which may also be implemented using a voltage divider network, and the voltage source 94 may provide an offset voltage. Additionally, as illustrated in FIG. 1 the other input terminals of the integrating circuits 84 and 88 may be coupled together, at node M. The integrating circuits 84 and 88 may be implemented as differential integrators, and are for convenience referred to hereinafter as "differential integrating circuits."

As illustrated in FIG. 1, the outputs of the differential integrating circuits 84, 88 may be coupled to the current sense $C_s$ input terminal of the respective current mode control circuits 26 via a diode 98 and a resistor 100. The resistors 68 and 100 constitute a voltage divider network and can be scaled to provide the appropriate input voltage to the current sense $C_s$ input terminal of the current mode control circuits 26.

If the power converters 12, 14 are sharing the load current in an equal fashion, then the output of the current sense integrating circuit 82 (node N) will be at the same potential as the output of the current sense integrating circuit 86 (node P). As a consequence, node M will be at the same potential, and the inputs to each of the differential integrating circuits 84, 88 will be identical, thereby maintaining current sharing between the power converters.

According to one embodiment, current share control may occur in four different modes depending upon the offset error terms in the high-speed current share control loop (the interconnection of the $V_e$ signal terminals of the control circuits 26) and the setpoint errors in the respective converter voltage loops, i.e., the feedback from the respective voltage error amplifiers 36 for each of the respective power converters 12, 14.

For example, consider the case where the first converter 12 is in control. In this case, "in control" means that the $V_e$ signal servo point of the converter 12 is lower than the $V_e$ signal servo point for the converter 14. As such, the node L is clamped to the lowest servo point, and the voltage error amplifier 36 with the higher servo point (voltage error amplifier 36 for the converter 14 in this example) will integrate high and as such be disabled. In this mode, the second converter 14 is being current programmed by the first converter 12, and the voltage loop of second converter 14 is no longer active. Additionally consider that the output current of the first converter 12 is lower than the output current of the second converter 14. As such, the potential at node P will be greater than the potential at node M, thereby causing differential integrating circuit 88 to integrate positive, forcing an offset into the current sense $C_s$ signal for the second converter 14. Because the voltage loop of the second converter 14 is no longer active, this will have the effect of lowering the current in the second converter 14 and raising the current in the first converter 12. Differential integrating circuit 88 will continue to integrate until the steady-state offset condition is reached as dictated by the value of the voltage source 96.

Another current share control mode may occur when, in the same clamped state, the output current of the first converter 12 is greater than the output current of the second converter 14. In this condition, the potential at node N will be greater than the potential at node M, thereby causing the differential integrating circuit 84 to integrate positive, forcing an offset into the current sense $C_s$ signal for the first converter 12. Because the voltage loop of the first converter 12 is still in control, this will have the effect of forcing the error voltage signal $V_e$ to increase. Because the voltage loop of the second converter 14 has been disabled, an increase in the potential at node L will force the current in the second converter 14 to increase and the current in the first converter 12 to decrease. The differential integrating circuit 84 will continue to integrate until the steady-state offset condition is reached, as dictated by the value of the voltage source 94.

The other two modes of operation concern the condition of when the second converter 14 is in control. Because these modes are analogous to those described previously, the operation is not further described herein.

Thus, according to certain embodiments, the slow loop current share control circuit 80 may be configured to effectively null (i.e., minimize) errors (such as offset errors and peak-to-average errors) of the high-speed (or "transient condition") current share control loop (interconnection of the $V_e$ signals via node L). Consequently, the high-speed current share control loop may provide robust transient condition response and the slow loop current share control circuit 80 may provide accurate steady-state DC control. This feature is useful when the paralleled converters are two-quadrant in nature, although benefits of the present invention may also be realized in one-quadrant paralleled converters.

Figure 4:
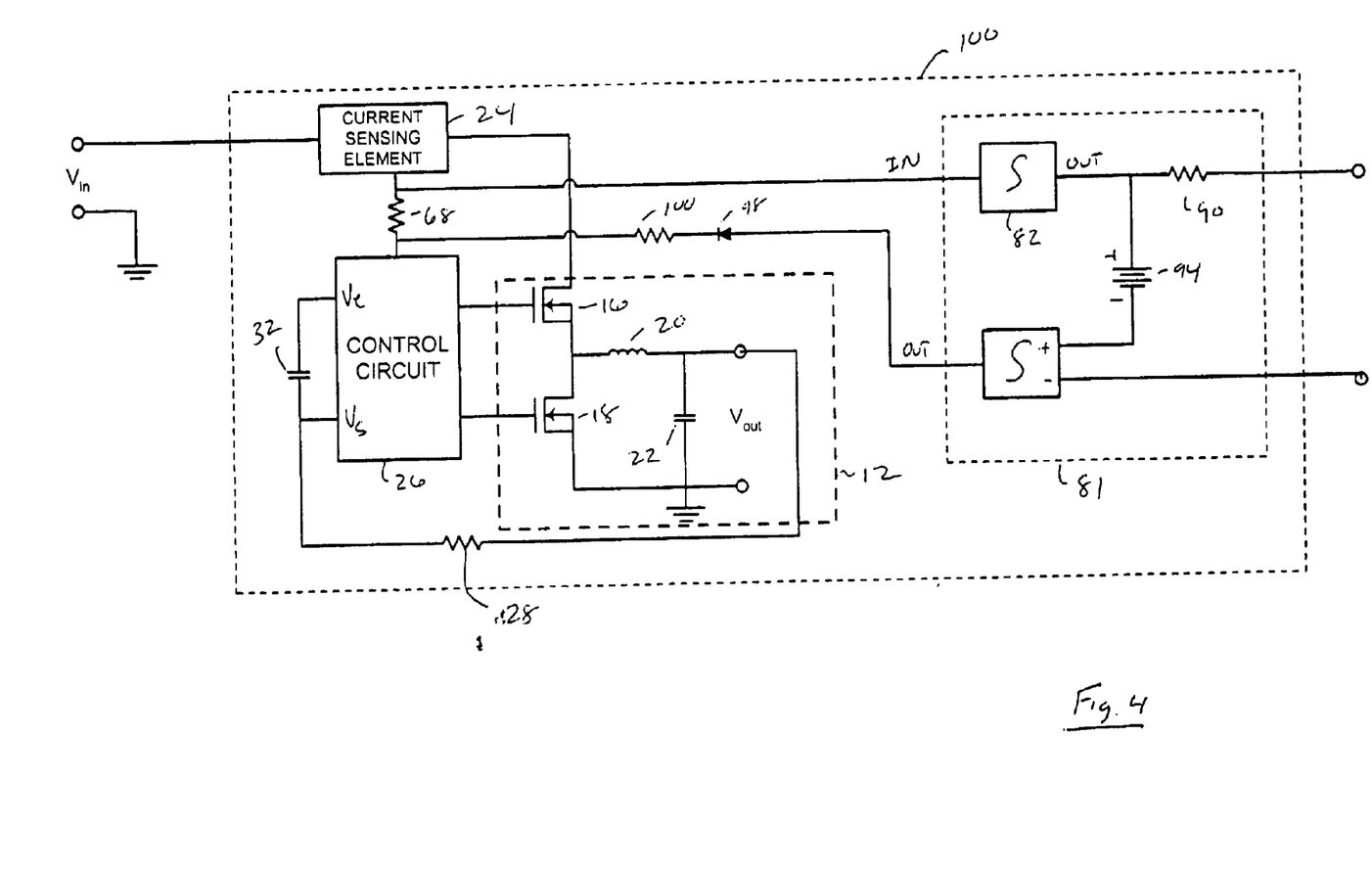
FIG. 4 is a schematic of a power supply module according to an embodiment of the present invention.

According to another embodiment, the present invention is directed to a power supply module 100. As illustrated in FIG. 4, the module 100 may include a converter 12 and a slow loop current share control sub-circuit 81. Two or more modules 100 may be connected together in a current-sharing fashion, as indicated in FIG. 1, by coupling together (i) the $V_e$ terminals (node L), (ii) the output voltage terminals ($V_{out}$) of the respective modules, and (iii) the output terminals of the slow loop current share control sub-circuits (node M).

Although the present invention has been described herein with respect to certain embodiments, those of ordinary skill in the art will recognize that many modifications and variations of the present invention may be implemented. For example, as described previously, the power converters 12, 14 may be buck converters, boost converters, buck-boost converters, or any topology derived therefrom. In addition, the power supply 10 may include more than two paralleled converters. Also, the power converters 12, 14 may include synchronous rectifiers. In addition, according to another embodiment, the sensed current input to the current sense integrating circuits may be the inductor 20 current during the D state (where D is the ON period of the switching device 16 relative to the switching cycle), the 1-D state, the entire switching interval, or any combination thereof. The foregoing description and the following claims are intended to cover all such modifications and variations.

What is claimed is:

1. A power supply, comprising:
   first and second current mode controlled power converters connected in parallel to power a load having a load current, wherein the first power converter includes a first current mode control circuit responsive to a first current sense signal and wherein the first current mode control circuit includes a first voltage error amplifier, and wherein the second power converter includes a second current mode control circuit responsive to a second current sense signal and wherein the second current mode control circuit includes a second voltage error amplifier, and wherein an output terminal of the first voltage error amplifier is connected to an output terminal of the second voltage error amplifier to thereby form a high-speed current share control loop; and
   a slow loop current share control circuit responsive to a sensed current in each of the first and second power converters for minimizing errors of the high-speed current share control loop by introducing an offset on one of the first and second current sense signals.

2. The power supply of claim 1, wherein the first power converter includes a buck converter and the second power converter includes a buck converter.

3. The power supply of claim 2, wherein the first power converter includes a synchronous buck converter and the second power converter includes a synchronous buck converter.

4. The power supply of claim 1, wherein each of the first and second power converters is selected from a group consisting of a buck converter, a boost converter, and a buck-boost converter.

5. The power supply of claim 1, wherein each of the first and second power converters includes at least one synchronous rectifier.

6. The power supply of claim 1, further comprising:
   a first current sensing element for sensing the sensed current in the first power converter; and
   a second current sensing element for sensing the sensed current in the second power converter,
   and wherein the slow loop current share control circuit has a first input terminal connected to an output terminal of the first current sensing element and a second input terminal connected to an output terminal of the second current sensing element.

7. The power supply of claim 6, wherein:
   the first current sensing element includes a transformer; and
   the second current sensing element includes a transformer.

8. The power supply of claim 6, wherein the first current sensing element is for sensing a current through a switching device of the first power converter.

9. The power supply of claim 6, wherein the first current sensing element is for sensing a current through an inductor of the first power converter.

10. The power supply of claim 6, wherein the slow loop current share control circuit includes at least one integrating circuit.

11. The power supply of claim 6, wherein the slow loop current share control circuit includes:
    a first current sense integrating circuit having an input terminal connected to the output terminal of the first current sensing element;
    a second current sense integrating circuit having an input terminal connected to the output terminal of the second current sensing element;
    a first differential integrating circuit having a first input terminal connected to an output terminal of the first current sense integrating circuit, and having an output terminal connected to an input terminal of the first current mode control circuit of the first power converter; and
    a second differential integrating circuit having a first input terminal connected to an output terminal of the second current sense integrating circuit, a second input terminal connected to a second input terminal of the first differential integrating circuit, and an output terminal connected to an input terminal of a the second current mode control circuit of the second power converter.

12. The power supply of claim 11, wherein the output terminal of the first differential integrating circuit is connected to a first input terminal of a comparator of the first current mode control circuit of the first power converter, and the output terminal of the first voltage error amplifier is connected to a second input terminal of the comparator.

13. The power supply of claim 11, wherein the slow loop current share control circuit further includes a pair of series-connected resistors connected between the output terminal of the first current sense integrating circuit and the output terminal of the second current sense integrating circuit.

14. The power supply of claim 13, wherein a node between the pair of series-connected resistors is connected to the second input terminals of the first and second differential integrating circuits.

15. The power supply of claim 14, wherein the slow loop current share control circuit further includes:
a first voltage source connected between the output terminal of the first current sense integrating circuit and the first input terminal of the first differential integrating circuit; and
a second voltage source connected between the output terminal of the second current sense integrating circuit and the first input terminal of the second differential integrating circuit.

16. The power supply of claim 15, further comprising:
a first diode connected between the output terminal of the first differential and the input terminal of the first current mode control circuit of the first power converter; and
a second diode connected between the output terminal of the second differential and the input terminal of the second current mode control circuit of the second power converter.

17. A power supply, comprising:
first and second current mode controlled, synchronous buck converters connected in parallel to power a load having a load current, wherein the first synchronous buck converter includes a first voltage error amplifier and the second power converter includes a second voltage error amplifier, and wherein an output terminal of the first voltage error amplifier is connected to an output terminal of the second voltage error amplifier;
a first current sensing element for sensing a current in the first synchronous buck converter;
a second current sensing element for sensing a current in the second synchronous buck converter; and
a slow loop current share control circuit for forcing the first and second power converters to equally contribute to the load current based on the currents sensed by each of the first and second current sensing elements.

18. The power supply of claim 17, wherein the slow loop current share control circuit includes at least one integrating circuit.

19. The power supply of claim 17, wherein the slow loop current share control circuit includes:
a first current sense integrating circuit having an input terminal connected to an output terminal of the first current sensing element;
a second current sense integrating circuit having an input terminal connected to an output terminal of the second current sensing element;
a first differential integrating circuit having a first input terminal connected to an output terminal of the first current sense integrating circuit, and having an output terminal connected to an input terminal of a current mode control circuit of the first synchronous buck converter; and
a second differential integrating circuit having a first input terminal connected to an output terminal of the second current sense integrating circuit, a second input terminal connected to a second input terminal of the first differential integrating circuit, and an output terminal connected to an input terminal of a current mode control circuit of the second synchronous buck converter.

20. A power supply, comprising:
a first power converter including at least one switching device;
a second power converter including at least one switching device, wherein the second power converter is connected in parallel with the first power converter;
a first control circuit for controlling the switching device of the first power converter;
a second control circuit for controlling the switching device of the second power converter;
a first voltage error amplifier responsive to an output voltage of the first power converter and having an output terminal connected to a first input terminal of the first control circuit;
a second voltage error amplifier responsive to an output voltage of the second power converter and having an output terminal connected to a first input terminal of the second control circuit, wherein the first input terminal of the second control circuit is connected to the first input terminal of the first control circuit; and
a slow loop current share control circuit responsive to a sensed current in each of the first and second power converters, and having a first output terminal connected to a second input terminal of the first control circuit and a second output terminal connected to a second input terminal of the second control circuit.

21. The power supply of claim 20, wherein each of the first and second power converters is selected from the group consisting of a buck converter, a boost converter, and a buck-boost converter.

22. The power supply of claim 21, wherein each of the first and second power converters includes a synchronous rectifier.

23. The power supply of claim 20, wherein:
the first control circuit includes a current mode control circuit; and
the second control circuit includes a current mode control circuit.

24. The power supply of claim 20, further comprising:
a first current sensing element for sensing the sensed current in the first power converter; and
a second current sensing element for sensing the sensed current in the second power converter,
and wherein the slow loop current share control Circuit has a first input terminal connected to an output terminal of the first current sensing element and a second input terminal connected to an output terminal of the second current sensing element.

25. The power supply of claim 24, wherein:
the first current sensing element includes a transformer; and
the second current sensing element includes a transformer.

26. The power supply of claim 24, wherein the slow loop current share control circuit includes at least one integrating circuit.

27. The power supply of claim 24, wherein the slow loop current share control circuit includes:
a first current sense integrating circuit having an input terminal connected to the output terminal of the first current sensing element;
a second current sense integrating circuit having an input terminal connected to the output terminal of the second current sensing element;
a first differential integrating circuit having a first input terminal connected to an output terminal of the first current sense integrating circuit, and having an output terminal connected to an input terminal of a current mode control circuit of the first power converter; and
a second differential integrating circuit having a first input terminal connected to an output terminal of the second current sense integrating circuit, a second input terminal connected to a second input terminal of the first differential integrating circuit, and an output terminal connected to an input terminal of a current mode control circuit of the second power converter.

28. The power supply of claim 27, wherein the slow loop current share control circuit further includes a pair of series-connected resistors connected between the output terminal of the first current sense integrating circuit and the output terminal of the second current sense integrating circuit.

29. The power supply of claim 28, wherein a node between the pair of series-connected resistors is connected to the second input terminals of the first and second differential integrating circuits.

30. The power supply of claim 29, wherein the slow loop current share control circuit further includes:
a first voltage source connected between the output terminal of the first current sense integrating circuit and the first input terminal of the first differential integrating circuit; and
a second voltage source connected between the output terminal of the second current sense integrating circuit and the first input terminal of the second differential integrating circuit.

31. The power supply of claim 30, further comprising:
a first diode connected between the output terminal of the first differential and the input terminal of the current mode control circuit of the first power converter; and
a second diode connected between the output terminal of the second differential and the input terminal of the current mode control circuit of the second power converter.

32. A power supply, comprising:
first and second current mode controlled power converters connected in parallel to power a load having a load current, wherein the first power converter includes a first current mode control circuit responsive to a first current sense signal and wherein the first current mode control circuit includes a first voltage error amplifier, and wherein the second power converter includes a second current mode control circuit responsive to a second current sense signal and wherein the second current mode control signal includes a second voltage error amplifier, and wherein an output terminal of the first voltage error amplifier is connected to an output terminal of the second voltage error amplifier to thereby form a high-speed current share control loop; and
means, responsive to a sensed current in each the first and second power converters, for minimizing errors of the high-speed current share control loop by introducing an offset on one of the first and second current sense signals.

33. The power supply of claim 32, wherein each of the first and second power converters is selected from the group consisting of a buck converter, a boost converter, and a buck-boost converter.

34. The power supply of claim 33, wherein each of the first and second power converters includes a synchronous rectifier.

35. The power supply of claim 32, further comprising:
a first current sensing element for sensing the sensed current in the first power converter; and
a second current sensing element for sensing the sensed current in the second power converter,
and wherein the means for minimizing errors is connected to the first and second current sensing elements.

36. The power supply of claim 35, wherein:
the first current sensing element includes a transformer; and
the second current sensing element includes a transformer.

37. A current share method for a power supply having at least two paralleled converters for powering a load, comprising:
generating a first voltage error signal based on an output voltage of a first of the paralleled converters;
generating a second voltage error signal based on an output voltage of a second of the paralleled converters;
coupling the first and second voltage error signals to a common node, wherein an input terminal of a current mode control circuit of the first converter and an input terminal of a current mode control circuit of the second converter are both connected to the common node to provide a high-speed current share control loop;
sensing a current of a first current sense signal in the first converter;
sensing a current of a second current sense signal in the second converter; and
minimizing errors of the high-speed current share control loop during steady-state conditions of the power supply by introducing an offset on one of the first and second current sense signals.

38. The method of claim 37, wherein sensing the current in the first converter includes sensing current through a switch of the first converter.

39. The method of claim 37, wherein sensing the current in the first converter includes sensing current through an inductor of the first converter.

40. The method of claim 37, wherein sensing the current in the first converter includes sensing an output current of the first converter.

41. The method of claim 37, wherein minimizing errors of the high-speed current share control loop during steady-state conditions of the power supply by introducing an offset error in one of the first and second current sense signals includes introducing an offset error in one of the first and second current sense signals when one of the converters is not equally contributing to the load current of the load.

42. A power supply module, comprising:
a power converter;
a voltage en-or amplifier connected to the power converter and responsive to an output voltage of the power converter;
a current sensing element connected to the power converter for sensing a current in the power converter,
a slow loop current share control sub-circuit connected to the current sensing element, wherein the slow loop current share control sub-circuit includes:
a current sense integrating circuit having an input terminal connected to the current sensing element; and
a differential integrating circuit having an input terminal connected to an output terminal of the current sense integrating circuit, and having an output terminal connected to an input terminal of a current mode control circuit of the power converter.

43. The power supply module of claim 42, wherein the power converter includes a buck converter.

44. The power supply module of claim 43, wherein the power converter includes a synchronous buck converter.

45. The power supply module of claim 42, wherein the current sensing element includes a transformer.

46. The power supply module of claim 45, wherein the current sensing element is for sensing a current through a switching device of the power converter.

47. The power supply module of claim 42, wherein the slow loop current share control sub-circuit includes at least one integrating circuit.

48. The power supply module of claim 42, wherein the output terminal of the differential integrating circuit is connected to a first input terminal of a comparator of the current mode control circuit, and the output terminal of the voltage error amplifier is connected to a second input terminal of the comparator.

49. The power supply module of claim 42, wherein the slow loop current share control sub-circuit further includes a voltage source connected between the output terminal of the current sense integrating circuit and the input terminal of the first differential integrating circuit.

50. A power supply, comprising:
first and second current mode controlled power converters connected in parallel to power a load having a load current, wherein the first power converter includes a first voltage error amplifier and the second power converter includes a second voltage error amplifier, and wherein an output terminal of the first voltage error amplifier is connected to an output terminal of the second voltage error amplifier;
a first current sensing element for sensing the sensed current in the first power converter;
a second current sensing element for sensing the sensed current in the second power converter; and
a slow loop current share control circuit responsive to a sensed current in each of the first and second power converters for forcing the first and second power converters to equally contribute to the load current, wherein the slow loop current share control circuit has a first input terminal connected to an output terminal of the first current sensing element and a second input terminal connected to an output terminal of the second current sensing element.

51. The power supply of claim 50, wherein the slow loop current share control circuit includes at least one integrating circuit.

52. The power supply of claim 50, wherein the slow loop current share control circuit includes:
a first current sense integrating circuit having an input terminal connected to the output terminal of the first current sensing element;
a second current sense integrating circuit having an input terminal connected to the output terminal of the second current sensing element;
a first differential integrating circuit having a first input terminal connected to an output terminal of the first current sense integrating circuit, and having an output terminal connected to an input terminal of a current mode control circuit of the first power converter; and
a second differential integrating circuit having a first input terminal connected to an output terminal of the second current sense integrating circuit, a second input terminal connected to a second input terminal of the first differential integrating circuit, and an output terminal connected to an input terminal of a current mode control circuit of the second power converter.

53. The power supply of claim 52, wherein the output terminal of the first differential integrating circuit is connected to a first input terminal of a comparator of the current mode control circuit of the first power converter, and the output terminal of the first voltage error amplifier is connected to a second input terminal of the comparator.

54. The power supply of claim 53, wherein the slow loop current share control circuit further includes a pair of series-connected resistors connected between the output terminal of the first current sense integrating circuit and the output terminal of the second current sense integrating circuit.

55. The power supply of claim 54, wherein a node between the pair of series-connected resistors is connected to the second input terminals of the first and second differential integrating circuits.

56. The power supply of claim 55, wherein the slow loop current share control circuit further includes:
a first voltage source connected between the output terminal of the first current sense integrating circuit and the first input terminal of the first differential integrating circuit; and
a second voltage source connected between the output terminal of the second current sense integrating circuit and the first input terminal of the second differential integrating circuit.

57. A power supply, comprising:
first and second current mode controlled power converters connected in parallel to power a load having a load current, wherein the first power converter includes a first voltage error amplifier and the second power converter includes a second voltage error amplifier, and wherein an output terminal of the first voltage error amplifier is connected to an output terminal of the second voltage error amplifier;
a first current sensing element for sensing the sensed current in the first power converter; and
a second current sensing element for sensing the sensed current in the second power converter; and
means, connected to the first and second current sensing elements, for forcing the first and second power converters to equally contribute to the load current based on a sensed current in each of the first and second power converters.

* * * * *